United States Patent [19]
Rudzewicz et al.

[11] Patent Number: 5,369,342
[45] Date of Patent: Nov. 29, 1994

[54] PREDICTIVE ELECTRIC MOTOR POSITIONING DEVICE, CALIBRATION SYSTEM THEREFOR

[75] Inventors: Robert G. Rudzewicz, Sterling Heights; Michael A. Dahl, Royal Oak; Thomas G. Dunn; Kenneth J. Wenzel, both of Farmington Hills; Ronald A. Muckley, Milford, all of Mich.

[73] Assignee: Chrysler Corporation, Highland Park, Mich.

[21] Appl. No.: 47,534

[22] Filed: Apr. 14, 1993

[51] Int. Cl.$^5$ .............................................. H02P 1/58
[52] U.S. Cl. ........................................ 318/102; 318/49; 318/54; 364/571.01
[58] Field of Search ....................... 318/34, 37–38, 318/40–42, 45–46, 49, 51, 53–55, 65, 66–68, 98–103, 106, 112–113; 364/571.04, 57.03, 571.01

[56] References Cited

U.S. PATENT DOCUMENTS

| | | | |
|---|---|---|---|
| 4,126,818 | 11/1978 | Taylor | 318/46 |
| 4,186,331 | 1/1980 | deBuhr et al. | 318/52 |
| 4,225,290 | 9/1980 | Allington | 318/48 X |
| 4,774,441 | 9/1988 | Toyomasu et al. | 318/102 |
| 4,866,354 | 9/1989 | Miller | 318/67 |

*Primary Examiner*—William M. Shoop, Jr.
*Assistant Examiner*—David Martin
*Attorney, Agent, or Firm*—Wendell K. Fredericks

[57] ABSTRACT

A method and firmware motor calibration system for measuring average system voltage of operating electric motors and time of movement between physical stops of mechanical structures coupled to the output shafts of the electric motors. The system calibrates motors arranged to operate as hybrid closed and open loop motor control systems. Data concerning position of the shafts is determined for the closed loop motor control systems.

8 Claims, 9 Drawing Sheets

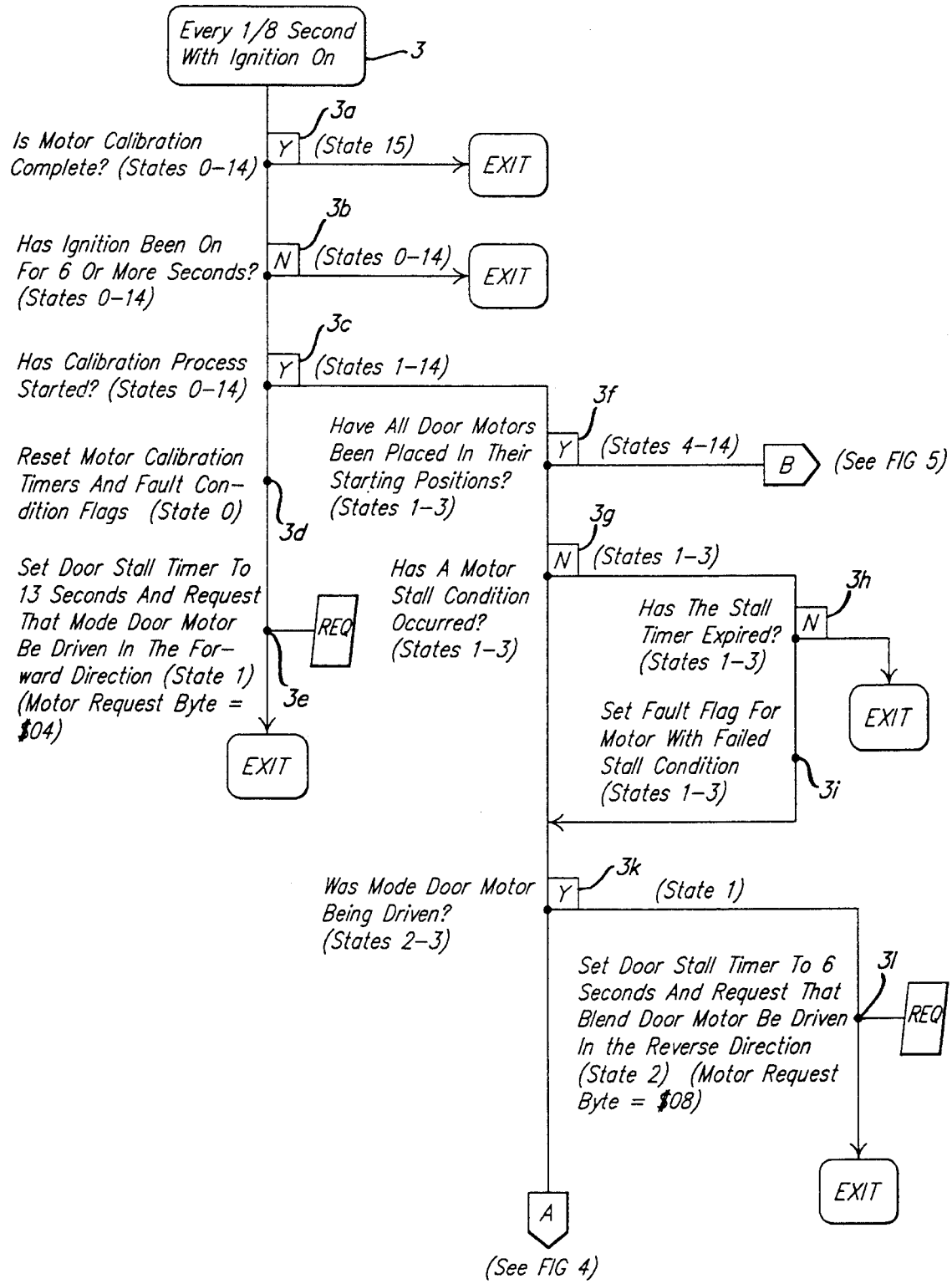

| STATE | MTRCTRL | STOPM1 ADC FDBK | STOPM0 ADC FDBK | CALTIMM SEC/32 | MODEIGN VDC | STOPB0 ADC FDBK | STOPB1 ADC FDBK | CALTIMB SEC/32 | BLNDIGN VDC | CALTIMR SEC/32 | MTRSTALL SEC/8 | IGNSUM VDC |
|---|---|---|---|---|---|---|---|---|---|---|---|---|
| 0 | 0 | 0 | 0 | 0 | 0 | 0 | 0 | 0 | 0 | 0 | 0 | 0 |
| 1 | $04 | 0 | 0 | 0 | 0 | 0 | 0 | 0 | 0 | 0 | 104 | 0 |
| 2 | $08 | 0 | 0 | 0 | 0 | 0 | 0 | 0 | 0 | 0 | 48 | 0 |
| 3 | $10 | 0 | 0 | 0 | 0 | 0 | 0 | 0 | 0 | 0 | 48 | 0 |
| 4 | $00 | 921 | 0 | 0 | 0 | 0 | 0 | 0 | 0 | 0 | 0 | 0 |
| 8 | $00 | 921 | 0 | 0 | 0 | 0 | 0 | 0 | 0 | 0 | 0 | 0 |
| 12(A) | $20 | 921 | 0 | 192 | 200 | 0 | 0 | 0 | 0 | 0 | 104 | 9600 |
| 12(B) | $20 | 921 | 0 | 192 | 200 | 204 | 0 | 0 | 0 | 0 | 0 | 9600 |
| 5 | $00 | 921 | 102 | 192 | 200 | 204 | 0 | 0 | 0 | 0 | 0 | 9600 |
| 9 | $00 | 921 | 102 | 192 | 200 | 204 | 0 | 0 | 0 | 0 | 48 | 0 |
| 13(A) | $01 | 921 | 102 | 192 | 200 | 204 | 819 | 0 | 0 | 0 | 0 | 4800 |
| 13(B) | $01 | 921 | 102 | 192 | 200 | 204 | 819 | 0 | 200 | 0 | 0 | 4800 |
| 6 | $00 | 921 | 102 | 192 | 200 | 204 | 819 | 96 | 200 | 0 | 0 | 4800 |
| 10 | $00 | 921 | 102 | 192 | 200 | 204 | 819 | 96 | 200 | 0 | 48 | 0 |
| 14(A) | $02 | 921 | 102 | 192 | 200 | 204 | 819 | 96 | 200 | 64 | 0 | 3200 |
| 14(B) | $02 | 921 | 102 | 192 | 200 | 204 | 819 | 96 | 200 | 64 | 0 | 3200 |
| 7 | $00 | 921 | 102 | 192 | 200 | 204 | 819 | 96 | 200 | 64 | 0 | 3200 |
| 15 | $00 | 921 | 102 | 192 | 200 | 204 | 819 | 96 | 200 | 64 | 0 | 3200 |

PREDICTIVE ELECTRIC MOTOR POSITIONING DEVICE, CALIBRATION SYSTEM THEREFOR

TECHNICAL FIELD

A portion of the disclosure of this patent document contains material which is subject to copyright protection. The copyright owner has no objections to the facsimile reproduction by anyone of the patent document or disclosure, as it appears in the Patent and Trademark Office patent file or records, but otherwise reserves all copyright rights whatsoever.

The present invention relates to predictive electric motor positioning devices and more particularly to automatic temperature control (ATC) systems using computer controlled electric motors and motor positioning algorithms for calibrating motor operations under normal vehicle power.

BACKGROUND ART

Many computer controlled electric motor systems employ calibration software to determine proper motor operations. A calibration routine occurs before normal automatic control operations and if an operating problem develops, a fault routine operates to correct the problem or to terminate motor operations.

In prior ATC networks of vehicles employing electric motors for controlling doors of the heater-ventilation-air conditioner units (HVAC), calibrating algorithms normally check for full opening and closing of doors driven by the motors. The computer using controlling software, in succession, moved each door motor in one direction until end-of-travel. An analog-feedback signal from a potentiometer associated with the motor provided a measured value for that position which the computer stored in memory.

Then the computer, using the controlling software, in succession, moved each door motor in the opposite direction to obtain and store another end-of-travel feedback signal value. The computer, usually a microcontroller unit (MCU) dedicated to the system, using this stored data, determined if the door feedback circuit operated properly.

This approach defined potentiometer settings at end-of-travel positions but does not yield any information concerning time between ends-of-travel. Such information factors in certain types of mathematical relationships to yield status of the mechanical gearing and linkage needed to affect door movement.

Hence, in developing calibration with improved accuracy for an ATC system, it is desirable to minimize errors. It is also desirable to perform calibration with computer programs performing automatically, without sacrificing effectiveness and creating a need for additional hardware.

To obtain the above-mentioned desiderata, a search was initiated. This search resulted in the present invention which incorporates average ignition voltages and door movement timing factors in an ATC network door calibration operation.

SUMMARY OF THE INVENTION

As a solution to these and other problems, the present invention provides an improved automatic system for calibrating motor movement and door positioning in computer controlled electric motor systems. More particularly, the computer using controlling firmware and hardware moves each motor door to travel extremes and measures analog feedback voltage similar to prior related calibration techniques. Rather than just obtaining feedback voltage measurements, the controlling firmware measures the average ignition voltage (the voltage supplied to the DC motors) during door movement and time required to traverse the doors from one end of travel to the next. This information yields door positioning data, a reference for determining system voltage deviations and timing data regarding mechanical linkage movement. Such information permits achieving several calibration enhancements. The system controls calibration not only for electric servo or closed-loop motor systems but it also manages calibration of open-loop motor systems as well as hybrid configurations of closed-and open-loop motors.

IN THE DRAWINGS

FIGS. 3 through 6(B) illustrate in flowchart form operations performed during $\frac{1}{8}$ second intervals of system calibration, the flowcharts containing notations referencing the various calibration states of FIG. 2A;

FIG. 9 presents a table containing system operation data.

DETAILED DESCRIPTION OF A PREFERRED EMBODIMENT

Figure 1:
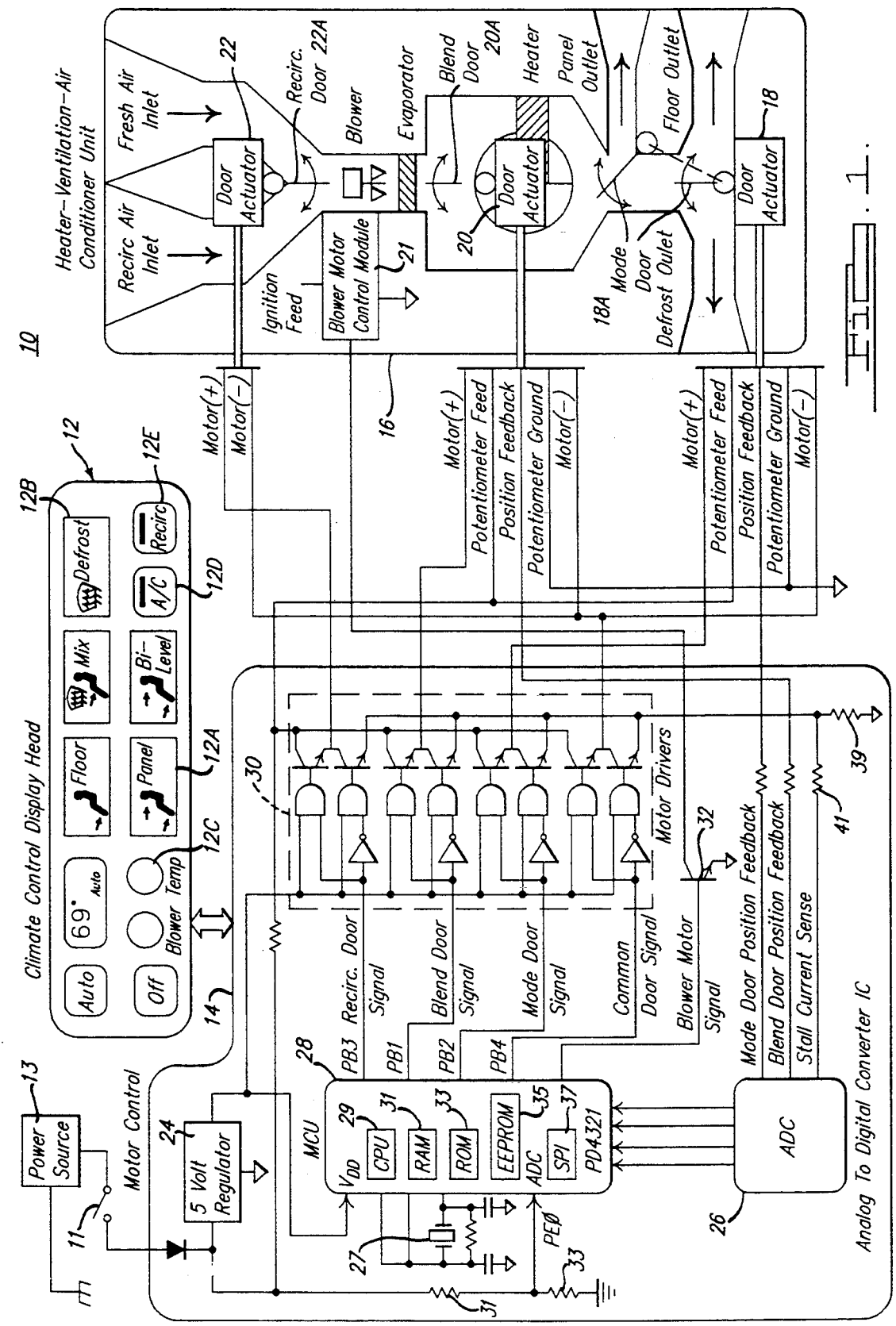
FIG. 1 illustrates in partial schematic and partial block diagram form an ATC system employing the motor control scheme of the present invention.

FIG. 1 illustrates in partial schematic and block diagram form an ATC system 10 employing the motor control scheme of the present invention. System 10, shown in an automobile environment, a preferred embodiment includes a climate control display panel 12, a motor control circuit 14 and a HVAC 16. Power source 13, normally an automobile battery, supplies power to system 10 after turning ON, illustratively, an ignition switch 11.

THE CONTROL PANEL-ATC DOOR MOVEMENT

Calibration, in this embodiment, requires moving three DC motors connected to ATC doors (namely the mode, blend and recirc doors) to full forward and full reverse stop positions. Rather than using buttons of Climate Control Display Head 12 to position the ATC doors to starting positions, these doors get positioned automatically. Presenting mode door logic signals to a door motor driver circuit 30 of a first polarity causes mode door 18A to move to a full forward stop, the starting position. Reversing the polarity, causes mode door 18A to move to the full reverse stop. Similar signals sent to the blend door and recirc door motors 20 and 22 respectively, position these doors in a like manner.

Time limits are provided for detecting abnormal stall conditions of both open and closed loop motors. Exceeding a time limit provides an indication of the presence of an electrically unattached motor, a defective motor or defective attached mechanical structure.

As for future use of the data, using calibration time data and obtaining average system voltages relative to the motor being driven permits calculating motor travel time required to reach a desired position and compensating these calculations for motor torque variations with rising and falling system voltages.

MOTOR CONTROL CIRCUIT

The motor control circuit 14 includes motor driver circuit 30 for driving door motors in the ATC system. Switching transistor 32 controls power to a blower motor 21. MCU 28 provides control signals to driver circuit 30 and contains a serial peripheral interface (SPI) 37 connected to an external analog-to-digital converter (ADC) 26. ADC 26 accepts analog signals from the potentiometer (not shown) associated with the blend and mode door motors 20 and 18 respectively and converts the analog signals into digital signals routed to MCU 28 through SPI 37. Also, stall current sensed by resistor 39 routes to ADC 26 via current limiting resistor 41. A five-volt regulator 24 supplies regulated power to MCU 28 and driver 30. Driver 30 also uses raw DC voltage, usually 12 VDC from power source 13. In a preferred embodiment, a MC68HC11 high-density CMOS (HCMOS) single-chip microcontroller from Motorola Inc. of Phoenix, Ariz. serves as MCU 28; a MC145051 analog-to-digital converter also from Motorola Inc. serves as ADC 26, and a LM 18298, dual full-bridge driver from National Semiconductor Corp. of Santa Clara, Calif. serves as motor driver 30. An internal A/D converter associated with port E of the MC68HC11 microcontroller receives an input signal from voltage divider network resistors 31 and 32 for sensing changes in ignition voltage.

Software Operations within the MCU

In a vehicle, the CPU 29 of MCU 28 shares software operations with several other systems associated with the vehicle. However, the program for calibrating the ATC resides in a background routine (a non-interrupt routine) or the main program. Interrupt signals from the climate control display head 12, power source 13, a reset IC (not shown) or 500 μs pulses from an internal output compare circuit do interrupt the background routine during normal operations.

A ⅛ second measured interval from a RAM based counter generates in the background program after enough 500 μs interrupts signals exit an internal output compare circuit in MCU 28. As mentioned supra, the output compare signal occurs every 500 μseconds. The RAM based counter increments every time the output compare signal appears. When this counter reaches 62 (31 ms.) or 63 (31.5 ms.) (the required value alternates to generate a 62.5 (31.25 ms.) average count), a 1/32 second task in a task dispatcher is queued. A RAM based counter associated with this 1/32 second task is incremented and is used to determine when to queue the 1/16, ⅛, ¼, ½, 1, 2, 4 and 8 second tasks for execution by a background program task dispatcher. This embodiment uses the 1/32 second task, the interval of the motor control routine; and the ⅛ second task, the interval of the calibration routine.

STATE DIAGRAMS

The Calibration States

Figure 2A:
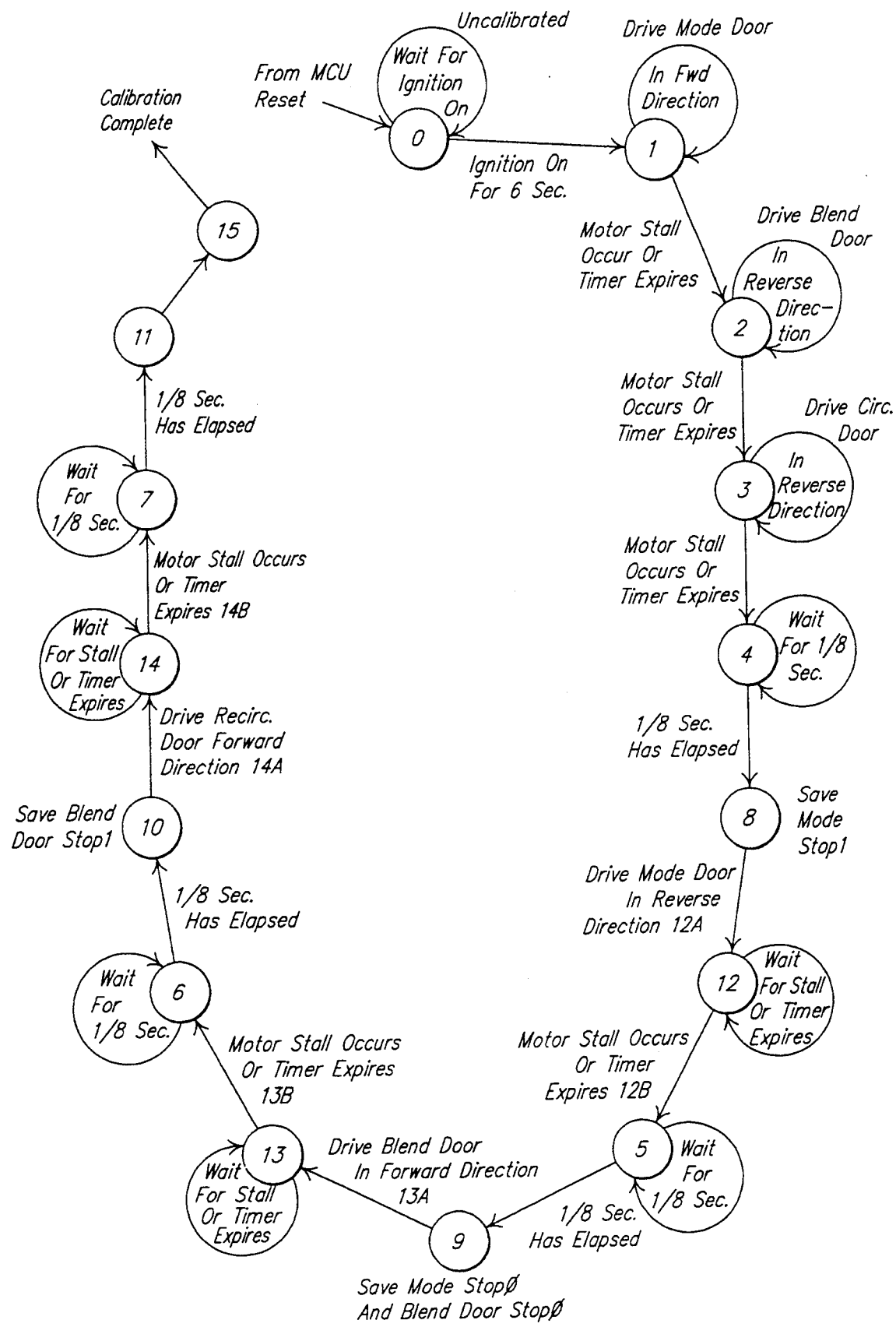
FIG. 2A depicts a state-transition diagram of system operations for performing calibration.

Firmware for CPU 29 employs a sequence of transition states used to step through various operations required to calibrate the motors. FIG. 2A depicts these calibration states. Nodes (0–15) designate the internal states and arcs, with arrow heads attached thereto, and connected between nodes depict input/output conditions that cause transitions between states. FIG. 2A shows one input signal (the reset signal from the CPU) and one output signal (indicating calibration complete). However, entry to and exit from the various internal states of the state diagram of FIG. 2A occur during the course of a subprogram.

Table 1 presents a listing of internal states and operations associated with each calibration state. The listing contains the sequence of states executed by CPU 29.

TABLE 1

| State# | Operation Performed |
|---|---|
| 0 | Uncalibrated motor state. |
| 1 | Drive mode door in forward direction to stop 1. |
| 2 | Drive blend door in reverse direction to stop 0. |
| 3 | Drive recirc door in reverse direction to stop 0. |
| 4 | Wait for analog inputs to settle. |
| 8 | Save mode door stop 1 position data. |
| 12A | Start driving mode door in reverse direction. |
| 12 | Wait for mode door stall at stop 0. |
| 12B | When stall occurs, save calibration time and average ignition voltage associated with the mode door. Stop driving the mode door motor. If a stall does not occur, then set the fault bit indicating mode door stall failure. |
| 5 | Wait for analog input to settle. |
| 9 | Save mode door stop 0 position data. Save blend door stop 0 position data. Check to see if the mode door feedback is valid. Adjust total mode door travel by 2%. |
| 13A | Start driving the blend door in the forward direction. |
| 13 | Wait for a blend door stall at stop 1. |
| 13B | When the stall occurs, save the calibration time and average ignition voltage associated with the blend door. Stop driving the blend door motor. If the stall does not occur, then set a fault bit indicating the blend door stall failure. |
| 6 | Wait for the analog input to settle. |
| 10. | Save the blend door stop 1 position data. Check to see if the blend door feedback is valid. Adjust total blend door travel by 2%. |
| 14A | Start driving the recirc door in forward direction. |
| 14 | Wait for the recirc door to stall at stop 1. |
| 14B | When the stall occurs, save the calibration time associated with the recirc door. Stop driving the recirc door motor. If the stall does not occur, then set fault bit indicating recirc door stall failure. |
| 7 | Wait (used to keep all motors off). |
| 11 | Not used. |
| 15 | Calibration completed. |

The Calibration States (cont.)

Included in FIG. 2A, for each internal state, labels above or below the connecting arcs designate input and output states. Input and output states help describe what condition causes the program to change from one state to the next. For example, a reset signal from CPU 29 represents the input state to state 0. A ⅛ second wait state cycles within state 0 until ignition switch 11 of FIG. 1 remains ON for at least 6 seconds. An output state directed to internal state 1 of FIG. 2A occurs within six seconds after turning ON the ignition switch.

The ATC Door Motor Control States

Figure 2B:
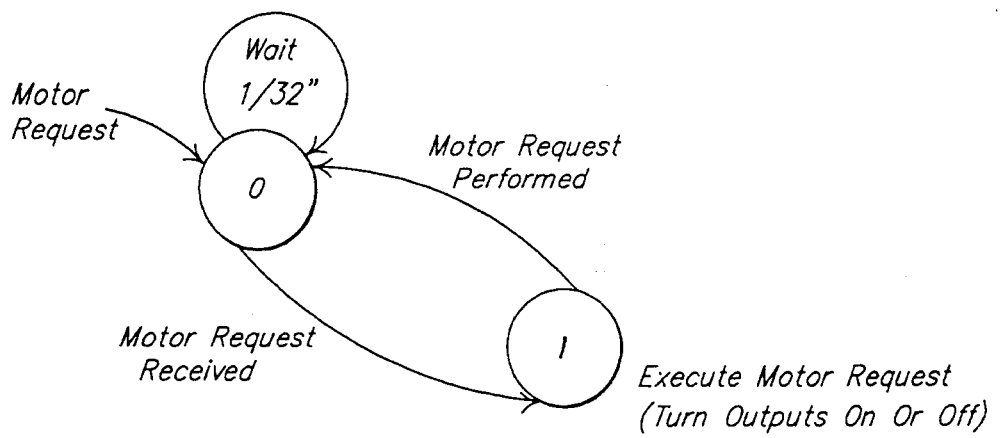
FIG. 2B depicts a state-transition diagram of operations of the ATC system motor control system during calibration.
Figure 4:
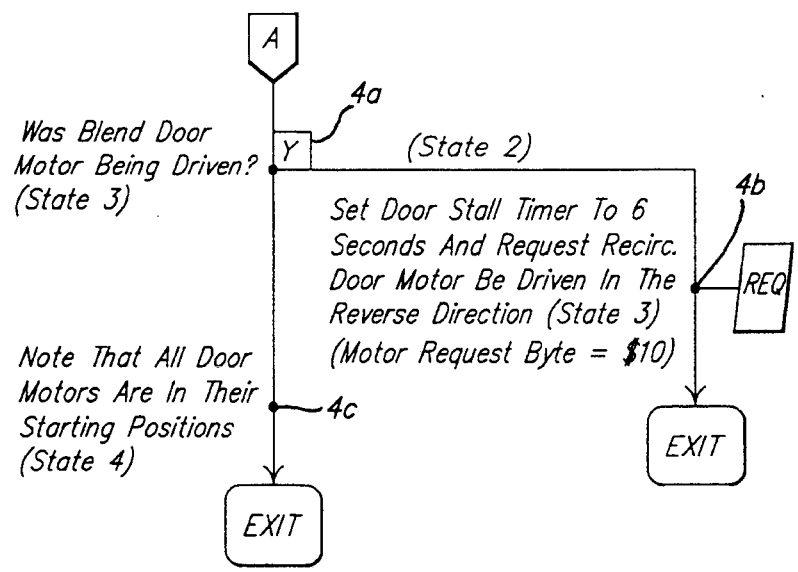

Firmware for the CPU employs a sequence of states for stepping through the various operations required to control the door motors. FIG. 2B depicts these states.

Table 2 presents a listing of the states and operations associated with each state. The listing contains the sequence of internal states executed by the CPU.

TABLE 2

| State# | Operation Performed |
|---|---|
| 0 | Wait for motor request |
| 1 | Execute motor request |

ATC DOOR MOTOR CALIBRATION SUBROUTINE

Refer now to FIGS. 3 through 8, there, a series of flow charts depict firmware instructions to CPU 29 which include cross references to the various internal states depicted in FIG. 2A. These flowcharts represent an effort to organize the generation and flow of system 10 signals. The structure differs from conventional box and diamond flow charts.

In these charts, signals entering and leaving the flow of control pass along lines and proceed down the page. Conventional start-of-program and end-of-program boxes exist. Trapezoidal or rectangularly shaped boxes indicate signals entering and leaving the flow of control. A small circle on the lines signifies action, the description of the action appearing adjacent to the circle to the left or right of the flow lines. When introducing a decision, the flow line branches to the right or left of a small decision box containing a YES or NO statement signified by a Y or N within the box. Without a branch, the main flow routes to the next circle or decision box. In cases of branching to a secondary flow path, after execution of the instructions in that path, an arrowhead depicts where the secondary flow rejoins the main flow. A reference number indicates the position or step along the line being discussed. CALIBRATION STATE 0: THE UNCALIBRATED MOTOR STATE After system reset, during state 0, the task requires the ignition voltage to remain ON for at least 6 seconds. Since the task dispatcher allocates ⅛ second for each task interval, 48 task intervals must happen before an output state results. If an output state results, indicating that the ignition had been ON for at least 6 seconds, then a state transition occurs. CPU 29 will start performing state 1 tasks.

At reset, all RAM status bytes get set to zero. Afterwards, assuming a turned ON ignition switch, to show accomplishment of State 0, refer to FIG. 3, steps 3, 3a and 3b. CPU 29 executes the instructions at these steps every ⅛ second interval of the calibration routine until the expiration of 6 seconds or 48 (⅛ second intervals). Because of an incomplete motor calibration, CPU 29 wants to wait 6 seconds. No branching occurs at step 3a but branching to exit occurs each ⅛ second interval at step 3b until expiration of 6 seconds.

Illustratively, after the 48th ⅛ second interval, a state-change line going from state 0 to state 1 of FIG. 2A indicates accomplishment of keeping the ignition switch ON for 6 seconds and the change from state 0 to state 1. State 1 initiates the start of the calibration process.

CALIBRATION STATE 1: DRIVING THE MODE DOOR FORWARD TO STOP 1

Figure 7:
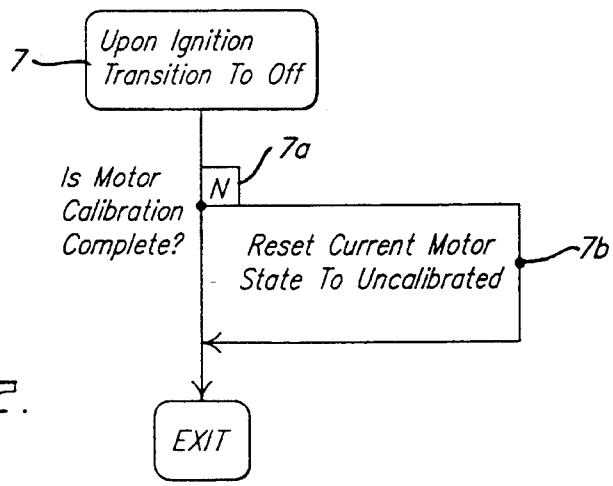
FIGS. 7 and 8 illustrate in flowchart form the operations performed during 1/32 second intervals of motor control, the flowcharts containing notations referencing the various motor states of FIG. 2B.
Figure 8:
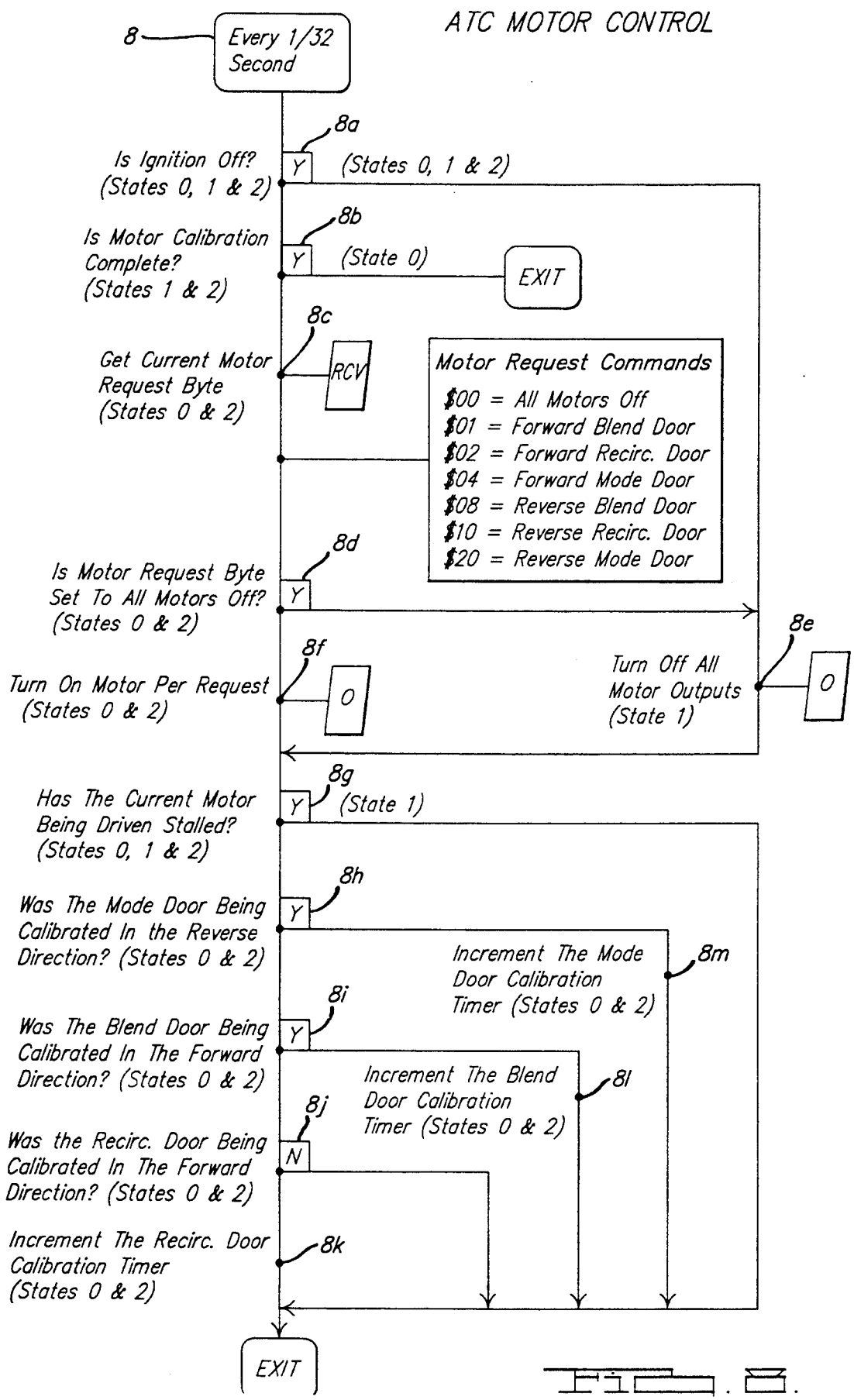

To drive the mode door forward to stop 0, CPU 29 must process an instruction in the calibration routine of FIG. 3 through 6 requesting the 1/32 second motor control routine of FIGS. 7 and 8 to operate the mode door motor.

Under the control of signals from CPU 29, firmware and associated hardware will attempt to drive the mode door motor 18 of FIG. 1 in a forward direction to cause the mode door 18A to move from a present position and then to stall at stop 1. If motor 18 operates properly, the stall must occur in less than 13 seconds. A stall timer in RAM keeps track of the time in ⅛ second intervals. If motor 18 operates improperly and does not stall, then CPU 29 sets a fault condition flag indicating existence of a stall problem. Normal movement of mode door 18A spans about 200° from a fully defrost mode position (stop 0) to a fully panel mode position (stop 1).

With reference again to FIG. 3, illustratively during interval 49 of the ⅛ second routine, while still in state 0, CPU 29 reenters the program at step 3 and without branching, moves to step 3d. Here, before concluding state 0, CPU 29 receives instructions to reset the motor calibration timers and fault condition flags. During calibration, the mode door calibration time byte (CALTIMM) increments to measure mode door movement time between stop 1 and stop 0. The incrementing occurs in 1/32 second intervals. CPU 29 sets a stall timer (MTRSTALL) byte to 104 counts to indicate a time limit of 13 seconds (measured in ⅛ second increments) and decremented in the ⅛ second task. This stall timer determines when a motor stall fault occurs. Also, if movement of the door exceeds this time limit, this condition would indicate a stall door or motor problem.

The fault condition flag resides in error condition byte (MTRFLAGS). Hence each bit of this byte in RAM will carry a logic 0.

Returning to FIG. 3, after completion of step 3d, before completing state 0, the program advances to step 3e. At step 3e, CPU 29 receives instructions to set the stall timer (MTRSTALL) to 13 seconds and then requests driving the mode door forward by setting motor request byte (MTRCTRL) to $04. This request initiates state 1.

This request routes to the ATC Motor Control routine for which the state diagram appears in FIG. 2B and the flow diagrams appear in FIGS. 7 and 8. After the request, CPU 29 exits the state 0 portion of the routine, conducts four (4) ATC motor control 1/32 second operations (motor control states 0 and 1) and then returns ⅛ of a second later.

CALIBRATION STATE 1: ATC MOTOR CONTROL

Before discussing ATC motor control during calibration, establishment of initial motor positions must take place. With reference to FIG. 7, with ignition Off (step 7), the ATC motor control routine determines status of motor calibration. If completed, the processing exits the routine. If not, the program instructs CPU 29 to branch to step 7b and execute the instruction requiring resetting the current motor state to uncalibrated (MSUNCAL). Then CPU 29 exits this portion of the routine.

Turning now to FIG. 8 of the 1/32 second ATC motor control routine, note at step 8, a clock cycle initiates this routine every 1/32 second. While in state 0, CPU 29 receives instructions at step 8a to determine the status of the ignition switch. If detecting an analog ignition voltage (AIGN) ignition ON signal at step 8a, CPU 29 will not branch. While still in state 0, at step 8b, CPU 29 receives instructions to investigate the status of the calibration routine. No branching occurs since CPU 29 will not find a calibration complete condition (MSCALCOM). Processing will move to step 8c.

At step 8c, CPU 29 receives the drive the mode door motor forward request indicated by a $04 byte. The ATC motor control uses a seven bit motor request byte. At step 8c, CPU 29 reads the motor request byte value and then moves to step 8d.

At step 8d, CPU 29 determines the status of the motor request byte. By decoding this information, CPU 29 determines that movement of the mode door motor in the forward direction is requested. Hence the program does not branch but moves to step 8f.

At step 8f, CPU 29 sends a mode door motor forward control signal (MTRFWDM) to motor driver circuit 30 of FIG. 1. This signal provides a positive polarity signal at port PB2, the mode door signal port and a negative polarity signal at the blend, recirc, and common door signal lines of port B.

Then the program moves to step 8g of FIG. 8 and instructs CPU 29 to determine the existence of a mode door stall. CPU 29 decides motor stalls by measuring the A/D Stall Sense signal (SVRSENRW) from the A/D converter 26 of FIG. 1. If a stall condition exists, the program instructs CPU 29 to exit this part of the motor control routine. If no stall condition exists, CPU 29 looks for the next instructions in FIG. 8.

The next instructions at step 8h, checks reverse direction movement of the mode door. If moving in the reverse direction (which should occur later in state 8 of the calibration routine), CPU 29 branches to step 8m to increment the mode door calibration timer (CALTIMM) before exiting the routine. If moving in the forward direction, CPU 29 without branching moves to step 8i to check for forward movement of the blend door. Since now, there is no movement of the blend door, CPU 29 moves to step 8j and receives instructions to check for forward movement of the recirc door. Since there is no movement of the recirc door, CPU 29 exits this routine.

CPU 29 continues to receive instructions from the motor control routine for the next four cycles of 1/32 second time or an ⅛ second interval before returning to the calibration routine of FIG. 3. This occurs provided no abnormal or normal stall conditions happen.

CALIBRATION STATE 1: COMPLETION OF STATE 1

In the calibration routine of FIG. 3, during the succeeding ⅛ second intervals, CPU 29 executes instructions at steps 3a and 3b without branching. A branch to step, 3f does occur from step 3c where CPU 29 must decide to branch again if all doors rest in starting positions. Since all doors do not rest in starting positions, CPU 29 encounters the instruction at step 3g.

At step 3g, without a motor stall condition, CPU 29 branches to step 3h. At step 3h, CPU 29 checks for the expiration of the stall timer (MTRSTALL). An unexpired (MTRSTALL) causes CPU 29 to exit the program. An expired (MRSTALL) causes CPU 29 to execute the instruction at step 3i requiring setting the fault flag for the motor with the failed stall condition. Then CPU 29 reads the instruction at step 3k.

At step 3k, CPU 29 checks the motor state (MSTATE) byte to see if the mode door was being controlled and branches to step 31 if the mode door motor was being controlled. CPU 29 follows the instruction at step 31 requiring setting the door stall timer to 6 seconds (a count of 48 of the ⅛ second increments) before instructing the ATC motor control routine to generate control signals to drive the blend door motor in the reverse direction (entry into state 2). CPU 29 performs the request by changing the motor request byte to $08.

CALIBRATION STATE 2: BLEND DOOR MOVED IN REVERSE

This state requires moving the blend door in the reverse direction from 0° to 67° for a period less then or equal to 6 seconds to stop 0. CPU 29 executes the 1/32 second motor control and the ⅛ second motor calibration routines until an abnormal or normal stall condition occurs.

In the 1/32 second motor control routine, if a normal stall condition occurs for the blend door, CPU 29 exits the routine from step 8g. During the next 1/32 second, CPU 29 branches to exit from step 8j since the recirc door was not being calibrated.

Likewise, in the ⅛ sec. motor calibration routine, if a stall condition occurs, then from step 3k, while driving the blend door, CPU 29 checks for any mode door movement. Not expecting any mode door movement, CPU 29 proceeds to point "A" of FIG. 4 and step 4a. At step 4a, CPU 29 determines the status of the blend door by checking the MSTATE byte. Since the blend door was being controlled, CPU 29 branches to the instruction at step 4b to set the door stall timer to 6 seconds and then request the motor control routine to move the recirc door in the reverse direction (state 3 of motor calibration) by setting the motor request byte to $10 before exiting the routine.

CALIBRATION STATE 3: RECIRC DOOR MOVED IN REVERSE

This state requires moving the recirc door in the reverse direction from 0° to 90° for a period less then or equal to 6 seconds to stop 0. CPU 29 executes the 1/32 second motor control and the ⅛ second motor calibration routines until an abnormal or normal stall condition occurs.

In the 1/32 second motor control routine, while driving the recirc motor in the reverse direction, CPU 29 executes instructions up to step 8j and then exits after checking for and not finding any forward movement of the recirc door. During a 1/32 second interval in which the recirc door reaches a stop and stalls, CPU 29 will execute the instructions up to step 8g and then branching to exit the routine upon detection of a stall.

Likewise, in the ⅛ second motor calibration routine, if a stall condition occurs, then from step 3k, CPU 29 checks the MSTATE byte to determine if the mode door was being controlled. Finding that the mode door was not being controlled, the program flow continues to point "A" of FIG. At step 4a, CPU 29 checks the MSTATE byte to determine if the blend door was being controlled as the recirc door moves to a starting position. Finding the blend door was not being controlled, and realizing that both mode and blend doors rest in starting positions, CPU 29 moves without branching to the instruction at step 4c that provides the indication of a change of state from state 3 to state 4 (all doors now rest in starting positions) before exiting.

CALIBRATION STATE 4: WAIT FOR THE ANALOG INPUTS TO SETTLE

During state 4, within a time period greater than ⅛ second, a system wait occurs to allow for stabilization of the analog feedback signals from the potentiometer of each motor.

Figure 5:
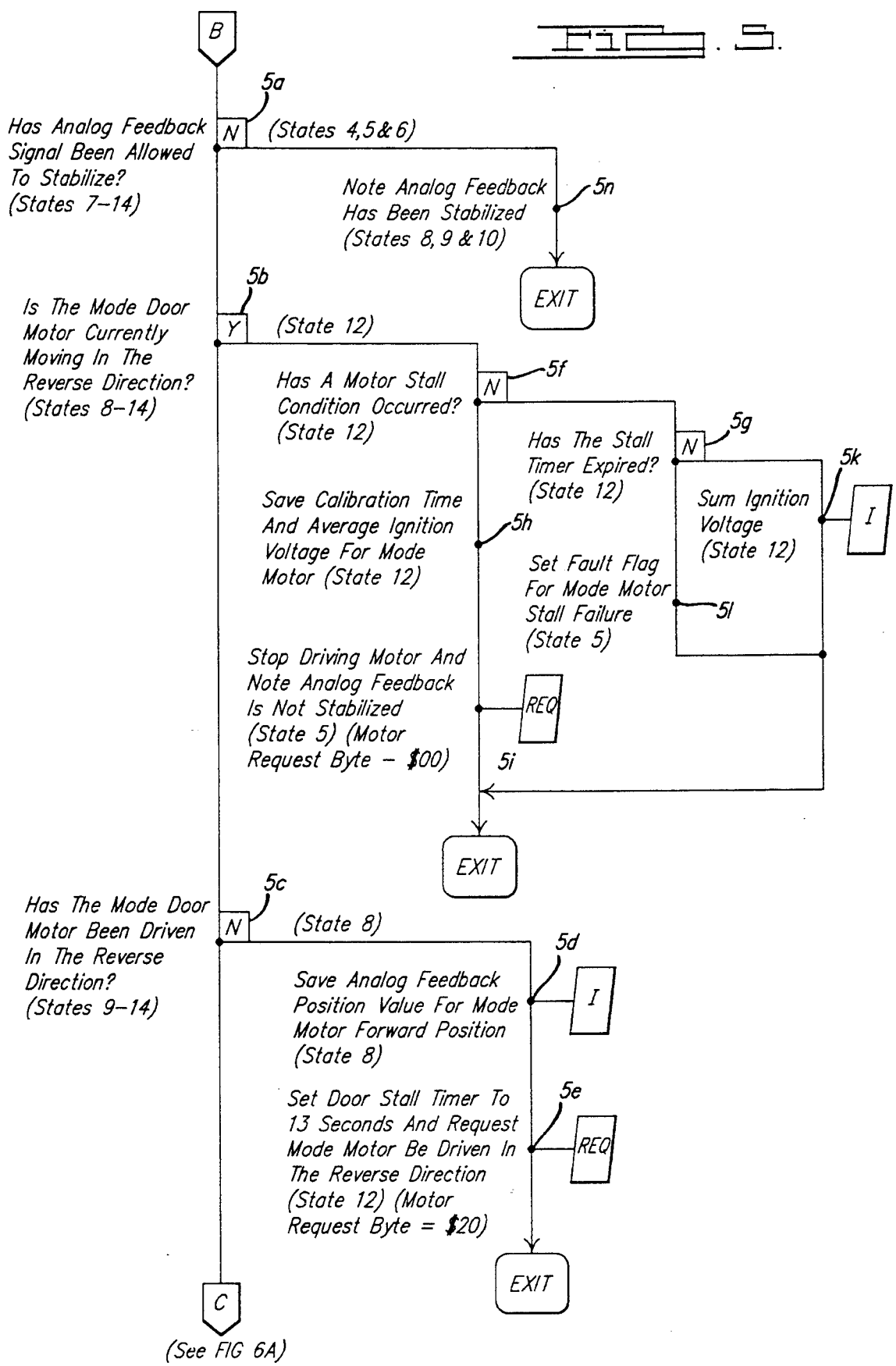

As shown in FIG. 3, CPU 29 enters state 4 at step 3c and branches to step 3f and then follows the routine which routes to point B of FIG. 5. At step 5a, CPU 29 determines if the analog feedback signal was allowed time to stabilize. If stable, remaining in calibration state 4, CPU 29 branches to the instruction at step 5n and enters into state 8 (due to the presence of stable analog feedback conditions) before exiting the routine. If not stable, CPU 29 exits the ⅛ second routine.

Upon returning to the ⅛ second routine, after an elapse of ⅛ second, CPU 29 reaches step 5a again and without branching, goes to step 5b (a state 8 instruction) to determine direction of movement of the mode door. Not detecting any movement, CPU 29 moves without branching to the step 5c instruction. Upon checking for and learning of no reverse movement of the mode door, CPU 29 branches to step 5d.

CALIBRATION STATE 8: SAVE MODE STOP 1 POSITION DATA. START DRIVING MODE DOOR IN REVERSE DIRECTION

Step 5d instructs CPU 29 to input and save from an output terminal of ADC 26 of FIG. 1, the analog position value for the mode door motor forward position. Then CPU 29 executes the step 5e instruction to set the MTRSTALL byte to 13 seconds (State 12A), and before exiting, to request instructions from the 1/32 second motor control routine of FIG. 8 to drive the mode door motor in the reverse direction (State 12A) by changing the Motor request byte to =$20.

DRIVING MODE DOOR IN REVERSE DIRECTION-STATE 12A

CPU 29 again receives instructions alternately from the ⅛ and 1/32 second routines when driving the mode door in reverse. The 1/32 second routine commands CPU 29 to drive the mode door motor in the reverse direction and to initiate measurement of motor travel time.

Turning now to FIG. 8 of the ATC motor control routine, at step 8c, CPU 29 receives the mode door motor request indicated by a $20 byte, to command CPU 29 to drive the mode door in the reverse direction. CPU 29 reads the motor request byte value and then moves to step 8d and without branching moves to step 8f since the motor request byte now stands at $20.

At step 8f, CPU 29 sends a mode door motor reverse control signal (MTRREVM) to motor driver circuit 30 of FIG. 1. This signal provides a negative polarity signal at port PB2, the mode door signal port and a positive polarity signal at the blend, recirc and common door signal pins of port B.

Then the program instructs CPU 29 at step 8g to determine any stalling of the driven mode door. CPU 29 determines motor stall by measuring the A/D Stall Sense signal (SVRSENRW) from the A/D converter 26 of FIG. 1. If a stall condition exist, CPU 29 receives instructions to exit this part of the motor control routine. If no stall conditions exist, CPU 29 looks at step 8h and checks for movement of the mode door in the reverse direction. If moving in the reverse direction, CPU 29 branches to step 8m to increment the mode door calibration timer before exiting the routine.

CPU 29 continues to receive instructions from the motor control routine for the next four cycles of 1/32 second time or a ⅛ second interval before returning to the calibration routine of FIG. 3. This occurs provided no abnormal or normal stall conditions exist.

STATE 12B: LOOKING FOR A MODE DOOR STALL IN STOP 0

In state 12B, CPU 29 waits for the mode door to stall at stop 0. When the stall occurs, CPU 29 saves the calibration time, calculates the average ignition voltage associated with the mode door, and stops driving the mode door motor. If the stall does not occur within 13 seconds, then CPU 29 sets a fault bit indicating mode door stall failure.

With reference again to FIG. 3 step 5b, after CPU 29 determines movement of the mode door motor in the reverse direction, CPU 29 takes a branch to step 5f (See steps 5b).

At step 5f, CPU 29 receives instructions to determine any occurrence of a motor stall condition. With the occurrence of a stall condition, CPU 29 looks in the main flow for the next instruction. The next main flow instruction at step 5h requires CPU 29 to save the calibration time and average the ignition voltage for the mode door motor. To obtain the ignition voltage values, CPU 29 must read the ignition voltage level at port E4 through an internal analog to digital converter (ADC). Then CPU 29 looks to instruction at step 5i.

The instruction at step 5i requires CPU 29 to stop driving the motor and note the instability of the analog feedback (Now in state 5). Then CPU 29 sets the motor request byte to $00 in order to receive instructions from the 1/32 second motor control routine to stop driving all motors before exiting the ⅛ second routine.

Without detecting a stall condition in step 5f, CPU 29 branches to step 5g to check for the expiration of the MTRSTALL timer. If not, the instruction at step 5g requires CPU 29 to input and sum the ignition voltage before exiting. If the stall timer had expired, then CPU 29 receives instructions to set the fault flag of the mode door stall failure before exiting.

STATE 5 WAIT FOR THE ANALOG INPUT TO SETTLE

State 5 permits settling of the analog feedback of the mode door motor after the mode door reaches end-of-travel at stop 0. The routine allows a first ⅛ second delay time for the mode door motor shaft position to settle. CPU 29 reenters the ⅛ second routine and then branching from step 3f to point B of FIG. 5. At step 5a, since the ⅛ second interval is just about up, CPU 29 branches to step 5n and notes the stabilizing of the analog feedback before exiting.

Upon the elapse of the ⅛ second delay, CPU 29 reenters the ⅛ second routine and proceeds without branching to step 5b. After determining no current movement of the mode door in the reverse direction, CPU 29 proceeds to step 5c. Step 5c requires deciding if the mode door had been driven in the reverse direction. Hence CPU 29, without branching moves to point C of FIG. 6 and enters calibration state 9.

STATE 9: SAVE MODE DOOR STOP 0 DATA THEN DRIVE BLEND DOOR MOTOR

State 9 requires CPU 29 to save the mode door stop 0 position data, save the blend door stop 0 position data, adjust the total mode door travel by 2% (1% from each end-of-travel to prevent hitting physical stops during normal operation) and start driving the blend door in the forward direction.

Figure 6A:
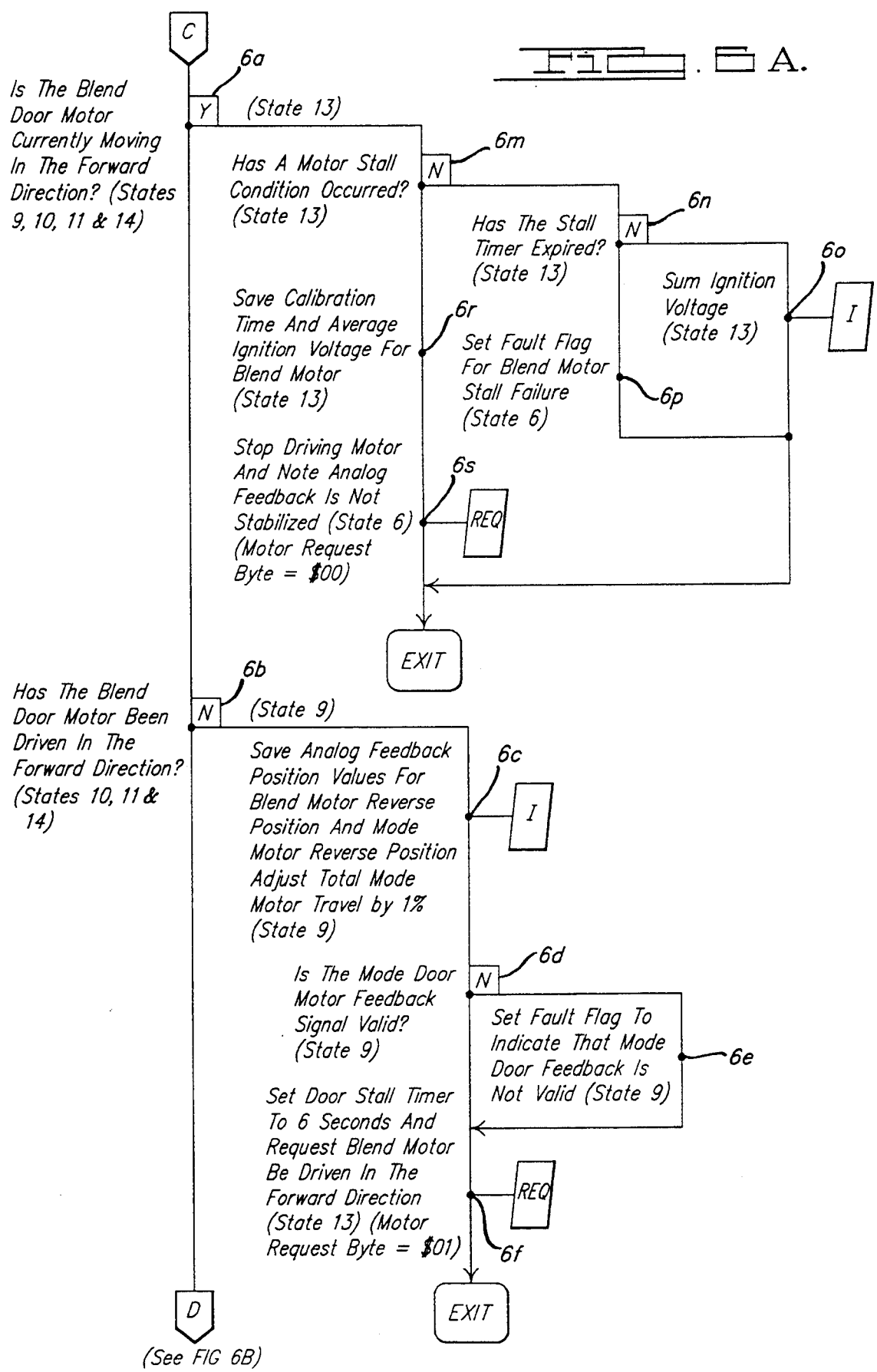
Figure 6B:
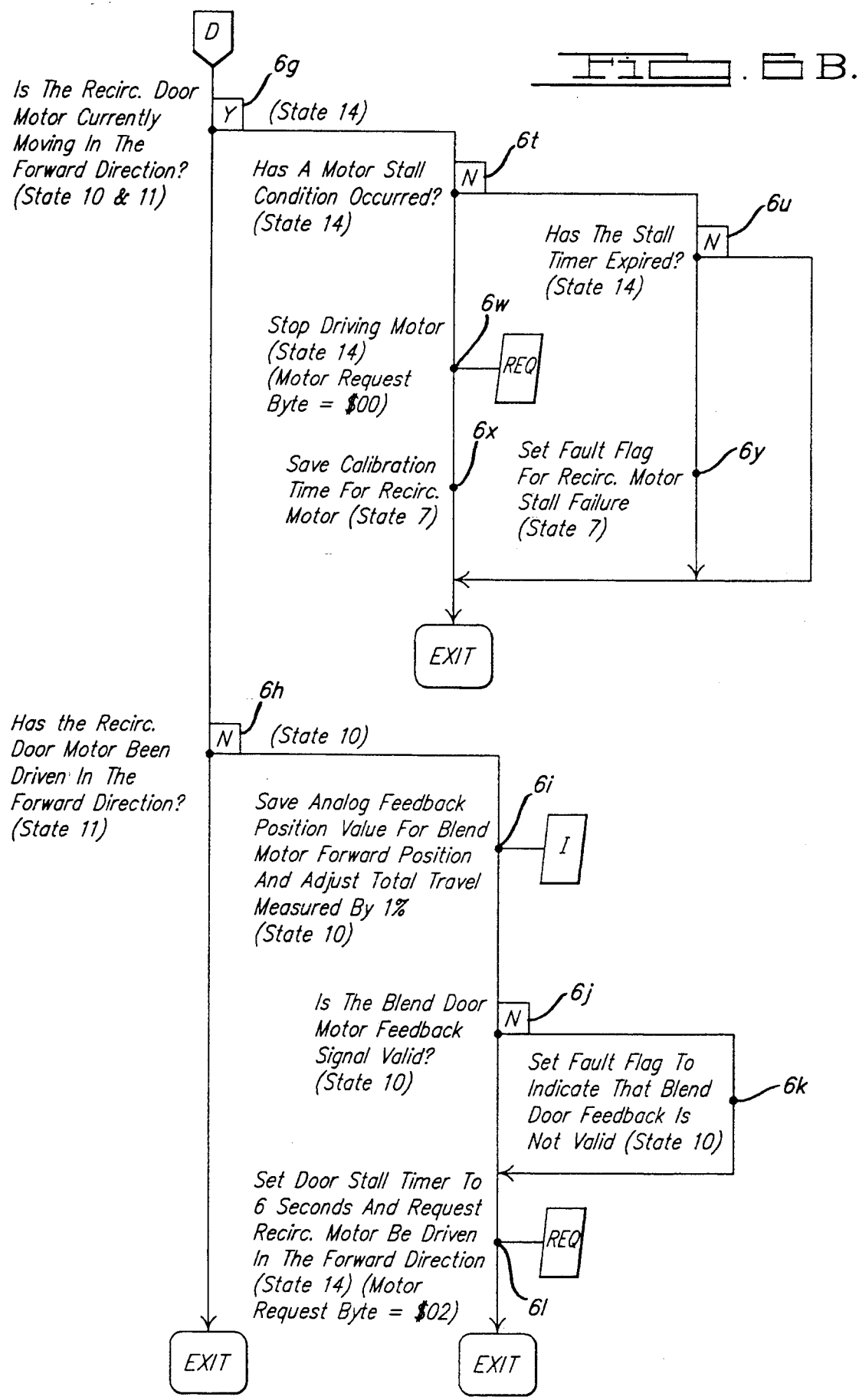

CPU 29 reenters the ⅛ second routine and moves down to process the state 9 instructions at step 6a and 6b of FIG. 6. The former instruction requires CPU 29 to determine any current blend door movement in the forward direction and the latter instruction requires CPU 29 to determine the occurrence of any past forward movement of the blend door. Since neither condition occurred, CPU 29 branches to the step 6c instruction.

Step 6c requires CPU 29 to fetch and save the analog feedback position values for the blend and mode door motors reverse positions and then adjust the total mode door motor travel by 2%. To do this, CPU 29 reads the ADC analog feedback converted signals from external ADC (26) of FIG. 1 for the reverse direction positions of the motors for the blend and mode doors, respectively.

Following the saving of the feedback data, CPU 29 processes the step 6f of FIG. 6 instruction (state 13) that requires setting the stall timer to 6 seconds and then instructing the 1/32 second motor control routine FIG. 8 to drive the blend door motor in the forward direction before exiting the routine. CPU 29 instructs the motor control routine to drive the blend door in the forward direction by setting the motor request byte to $01.

BLEND DOOR MOVED FORWARD-CALIBRATION STATE 13A

The blend door moves in the forward direction about 67° for a period less then or equal to 6 seconds.

STATE 13-WAITING FOR THE BLEND DOOR TO STABILIZE

CPU 29 executes The 1/32 second motor control and the ⅛ second motor calibration routines until an abnormal or normal stall condition occurs.

STATE 13B-OCCURRENCE OF MOTOR STALL OR TIMER EXPIRING

Assuming movement of the blend door motor, in the 1/32 second motor control routine, if a normal stall condition occurs for the blend door, CPU 29 exits the routine from step 8g. During the next 1/32 second, CPU 29 branches at step 8i and executes the instruction at step 8l which requires incrementing the blend door calibration timer before exiting the routine.

Likewise, in the ⅛ second motor calibration routine (state 13) at the instruction at step 6m, if no motor stall conditions occur, then the instruction at step 6n, causes CPU 29 to check for expiration of the MTRSTALL timer. If the MTRSTALL counter does not expire, then CPU 29 reads and then sums the ignition voltage at step 6o before exiting the routine. If the MTRSTALL counter expires, then from step 6n, CPU 29 sets a fault flag to indicate a blend motor stall failure (state 6) before exiting the routine.

For a normal stall condition in state 13B, from step 6m, CPU 29 saves the calibration time and average ignition voltage for the blend door (step 6r). At step 6s, CPU 29 will request the 1/32 second motor control routine to stop driving the motor (motor request byte =$00) and then note the lack of stabilization of the analog feedback (state 6) before exiting the routine.

STATE 6, WAIT FOR THE ANALOG INPUT TO SETTLE

In the 1/32 second interval routine, CPU 29 receives the request to stop driving the motor at step 8c. Then at step 8d, CPU 29 determines if the motor request byte turns all motors OFF. If so, than CPU 29 turns OFF all motors and exits the routine. This sequence continues over a period of four cycles until the accomplishment of the ⅛ second delay.

In the ⅛ second interval routine, CPU 29 checks at step 5a the lack of stability of the analog feedback signal and then branches to step 5n and processes the instruction to note stabilization of the analog feedback before exiting. During the next ⅛ second routine, CPU 29 processes the instructions up to step 6h before branching to step 6i.

STATE 10 SAVE BLEND DOOR STOP 1

At step 6i, CPU 29 executes the instruction to read the analog feedback position value for the blend door forward position and then adjust the total travel measured by 2%.

CPU 29 executes the instruction at step 6j to check for a valid blend door motor feedback signal. If no valid feedback signal exists, CPU 29 branches to the instruction at step 6k to set the fault flag to show the invalidity of the blend door feedback signal before moving to step 6l. A valid blend door motor feedback signal causes CPU 29 to execute the instruction at step 6l. The step 6l instruction causes CPU 29 to set the door stall timer to 6 seconds and then to instruct the 1/32 second motor control routine to drive the recirc door motor in the forward direction (This act marks entry into state 14A) before exiting the routine.

STATE 14A: RECIRC DOOR DRIVEN IN FORWARD DIRECTION

To drive the recirc door motor in the forward direction, CPU 29 instructs the 1/32 second routine by setting the motor request byte to $02. Then CPU 29 waits for a stall condition of the recirc door motor.

STATE 14: RECIRC DOOR MOVED FORWARD

The recirc door motor moves forward for about 90° over a period less then or equal to 6 seconds. CPU 29 executes the 1/32 second motor control and the ⅛ second motor calibration routines until an abnormal or normal stall condition occurs.

In the 1/32 second motor control routine, while driving the recirc motor in the forward direction, CPU 29 executes the instructions up to step 8j and then checks for recirc door motor movement in the forward direction. Finding forward movement, CPU 29 moves to execute the instruction at step 8k to increment the recirc door calibration timer before exiting the routine. During another 1/32 second interval in which the recirc door reaches a stop and stalls, CPU 29 will execute the instruction at step 8g and then branch to exit the routine.

Likewise, in the ⅛ second motor calibration routine, when moving the recirc motor in the forward direction, CPU 29 executes instructions up to step 6g and then branches to step 6t.

STATE 14B: RECIRC DOOR MOTOR STALL

At step 6t, CPU 29 checks for a motor stall condition. If no stalling, CPU 29 branches to step 6u and checks for expiration of the stall timer. If not expired, CPU 29 sums the ignition voltage before exiting the routine. If expired, CPU 29 executes the instruction at step 6y requiring the setting of the fault flag to indicate a recirc motor stall failure before exiting the routine.

Reentering the ⅛ second interval routine, when a stall condition occurs, CPU 29 executes instructions up to step 6t requiring a determination of a stall condition. Since the stall condition occurred, CPU 29 moves to step 6w and processes the instruction to send a request to the 1/32 second motor control routine to stop driving the motor (motor request byte = $00). After making the request, CPU 29 moves to step 6x and executes the instruction to save the calibration time and average ignition voltage for the recirc motor (entering now into state 7).

STATES 7, 11 & 15-WAITING FOR ANALOG INPUT TO SETTLE & COMPLETING CALIBRATION

In the 1/32 sec. interval routine, CPU 29 receives the request to stop driving the motor at step 8c. Then at step 8d, CPU 29 determines if the motor request byte sets all motors to OFF. If so, then CPU 29 turns OFF all motors and exits the routine. This sequence continues over a period of four cycles until the accomplishment of a ⅛ second delay.

In the ⅛ second interval routine, CPU 29 checks at step 5a for a stable analog feedback signal and then branches to step 5n and processes the instruction that requires a stable analog feedback before exiting. During the next ⅛ second interval, CPU 29 processes the instructions up to step 6h requiring a check for a forward driven recirc door motor (state 11). Since it has, CPU 29 then moves to step 6z or state 15 (Calibration complete) before exiting the routine.

OPERATION OF THE SYSTEM

To predict the operation of automatic temperature control systems and associated door moving mechanical gearing and linkage under normal operating power, travel time and voltage change data must be compiled. This system unlocks hidden information concerning ATC motor movement of the air deflection doors.

As mentioned supra, the ATC system employs both open and closed loop motor networks for controlling movement of the mode, blend and recirculation (recirc) doors. The mode and blend door motors provide analog feedback signals which indicate the present door positions. The recirc door motor provides no feedback signal but motor on-time governs motor movement. The ATC performs calibration when the system initially receives battery power following the loss of battery power or when performing system diagnostics.

FIG. 9 depicts in chart form the operation of the calibration system. Column 1 contains the various STATES of calibration from state 0 through state 15. Column 2 contains the motor control request RAM byte (MTRCTRL) values designated in the ⅛ second routine and interpreted by CPU 29 when executing instructions from the 1/32 second motor control routine to properly control motor movement in a selected state. Column 3 contains the mode door stop 1 (STOPM1) RAM word designating the ADC feedback value measured when the mode door is in a full forward position. Column 4 contains the mode door stop 0 (STOPM0) RAM word designating the ADC feedback voltage value when the mode door is in a full reverse position. Column 5 contains the mode door calibration time (CALTIMM) RAM word designating actual length of time of mode door movement. Column 6 contains RAM byte value representing the average ignition voltage during mode door calibration (MODEIGN). Column 7 contains the blend door stop 0 (STOPB0) RAM word designating the ADC feedback voltage value when the blend door is in a full reverse position. Column 8 contains the blend door stop 1 (STOPB1) RAM word designating the ADC feedback voltage value when the blend door is in a full forward position. Column 9 contains the blend door calibration time (CALTIMB) RAM word designating actual length of time of blend door movement. Column 10 contains the RAM byte value representing the average ignition voltage during blend door calibration (BLNDEIGN). Column 11 contains the actual recirc door calibration time (CALTIMR) RAM word designating length of time of recirc door movement. Column 12 contains motor stall time (MTRSTALL) RAM byte values decremented in ⅛ second intervals which establishes limits for the door movements. Column 13 contains RAM word (IGNSUM) which is the summation of ignition voltage values accumulated during motor calibration.

ASSUMPTIONS FOR THE EXAMPLE IN FIG. 9

The example of FIG. 9 assumes that ignition voltage ranges between 9-16 VDC. But 13.5 VDC equals the average ignition voltage. Mode door stops 1 and 0 feedback voltages equal about 4.5 and 0.5 VDC respectively, while blend door stops 1 and 0 feedback voltages equal about 4.0 and 1.0 VDC respectively. Maximum time of door movement between stops for the mode door equals 6 seconds, 3 seconds for the blend door, and 2 seconds for the recirc door. Also, this example assumes no stall failures exist.

STATE 0 RESULTS IN THE EXAMPLE

System RESET sets all RAM bytes and words to zero. CPU 29 contains an ignition timer in RAM which decrements in ⅛ second increments from 6 seconds down to 0. After the 48th ⅛ second interval, when the ignition timer reaches 0, CPU 29 initiates State 1, the start of the calibration process.

STATE 1 (MOVING THE MODE DOOR TO STOP 1 IN THE EXAMPLE)

CPU 29 changes the following RAM bytes as indicated:
(1) Stores $04 in the motor control RAM byte MTRCTRL. $04 causes the CPU to execute the instructions in the motor control routine to move the mode door forward.
(2) Stores a 0 in each bit of the error condition RAM byte (MTRFLAGS) [NOTE: this byte is not shown in the table].
(3) Removes 104 from ROM and stores this value in the motor stall RAM byte MTRSTALL. 104 equals 13 seconds in ⅛ second increments. This byte decrements from 104 down to a count representative of the time required to move the mode door from wherever it might be (between stop 0 and stop 1) to the starting position at stop 1. For the mode door, normal time for moving the door from stop 0 to stop 1 or from some point in between should not exceed 13 seconds. We don't want the count in MTRSTALL to reach zero.

As the mode door moves from its present position to Stop 1, the mode door calibration time RAM word CALTIMM increments in 1/32 second increments. If mode door motor 18 operates improperly and does not stall at stop 1, then CPU 29 sets a fault flag by enabling a bit in the error condition RAM byte MTRFLAGS to indicate the existence of a stall condition problem.

STATE 2 (MOVING THE BLEND DOOR TO STOP 0 IN THE EXAMPLE)

CPU 29 changes the following bytes:
(1) Stores a $08 in RAM byte MTRCTRL RAM byte to indicate that CPU 29 should use the ATC motor control instructions to move the blend door in the reverse direction to stop 0 from its present position;
(2) Retrieves from ROM 48 and then stores the count of 48 in RAM byte MTRSTALL. A count of 48=6 seconds in $\frac{1}{8}$ second increments. This is done in order to establish a limit for the count down to the time needed to move the blend door from the present location to the starting position at stop 0.

STATE 3 (MOVING THE RECIRC DOOR TO STOP 0 IN THE EXAMPLE)

CPU 29 changes the RAM bytes as follows:
(1) Stores $10 in RAM byte MTRCTRL to instruct the program to move the recirc door in the reverse direction.
(2) Store a count of 48 in RAM byte MTRSTALL since the stall time for the recirc door and the blend door require the same amount of time.

STATE 4 (WAITING FOR ANALOG INPUTS TO SETTLE IN THE EXAMPLE)

CPU 29 changes the following RAM byte as follows:
(1) Stores $00 in RAM byte MTRCTRL to turn OFF all door motors.

STATE 8 (SAVING ADC FEEDBACK OF MODE DOOR IN THE EXAMPLE)

CPU 29 changes the RAM byte and RAM word as follows:
(1) Leaves $00 stored in RAM byte MTRCTRL.
(2) Reads the ADC count of 921 and writes 921 in RAM word STOPM1. The maximum count of the ADC=1024 counts. A count of 1024=5.0 VDC. Hence 921/1024 * 5VDC=4.5 VDC. Thus the ADC feedback value for the mode door=4.5 VDC.

STATE 12A (DRIVING THE MODE DOOR TOWARD STOP 0 IN THE EXAMPLE)

CPU 29 changes the following RAM bytes and words:
(1) Stores $20 in RAM byte MTRCTRL to initiate Mode door movement in the reverse direction toward stop 0.
(2) Leaves 921 stored in RAM word STOPM1 since this was the actual ADC voltage reading.
(3) Leaves 0 stored in RAM word CALTIMM since at this time the mode door has not begun moving in the reverse direction.
(4) Stores a count of 104 in RAM word MTRSTALL. 104=104 * $\frac{1}{8}$ second or 13 seconds. This time represents a limit or the maximum time that the mode door should take in moving from Stop 1 to Stop 0.

STATE 12B (FOLLOWING MODE DOOR STOP 0 STALL IN THE EXAMPLE)

CPU 29 makes the following RAM word and byte changes:
(1) Since this example assumes no stall failures, all bits of the MTRFLAGS RAM byte remains at 0.
(2) MTRCTRL RAM byte remains at $20 indicating Mode door movement in the reverse direction.
(3) STOPM1 word remains at 921 counts indicating the initial voltage feedback is 4.5 VDC.
(4) RAM word CALTIMM now contains a value of 192. 192 counts =(192 * 1/32 sec) or 6 seconds. This time represents the actual time of travel of the mode door from Stop 1 to stop 0. Note that the time limit for this door=104 counts=(104 * $\frac{1}{8}$ second) or 13 seconds (the count in the MTRSTALL RAM byte in state 12A). Hence no error occurred since the Mode door moved from Stop 1 to Stop 0 in 6 seconds, well within the time limit.
(5) RAM word IGNSUM now contains a value of 9600, representing the summation of ignition voltages from stop 1 to Stop 0.
(6) Stores a count of 200 in RAM byte MODEIGN since the IGNSUM =9600 counts and 48 cycles of the calibration program are executed to obtain the ADC readings. Thus the average count for the mode door is 9600/48 or 200 counts.

This ADC measures in 8 bit A/D counts. The maximum count in the ADC would be 255 counts which represents the maximum readable voltage of 5 VDC. Hence 200 counts represents 200/255 counts * 5 VDC=0.784313 count * 5 VDC=3.92156 VDC.
(7) Stores 0 in RAM byte MTRSTALL once the stalk at stop 0 has occurred.

STATE 5 (WAITING FOR ANALOG INPUT TO SETTLE IN THE EXAMPLE)

CPU 29 changes the MTRCTRL byte to $00 indicating all door motors turned OFF while waiting for the analog input from the Mode door motor to settle.

STATE 9 (SAVING THE STOPM0 DATA IN THE EXAMPLE)

CPU 29 makes the following RAM word changes:
(1) Stores a count of 102 as the mode door ADC feedback count in RAM word STOPM0. (This count is used with the count of STOPM1 obtained in State 8 to obtain a determination of a valid feedback signal).
(2) Stores the blend door ADC feedback count of 204 in RAM word STOPB0.

Then CPU 29 checks the analog feedback measurements of the Mode door to determine if a valid feedback signal is present. This determination is based upon the amount of travel in A/D counts that occurred during calibration of the door motors. The following procedure is used to determine a valid feedback:
(a) Minimum allowable value for STOPM1-STOPM0=>737 counts; and
(b) Actual measured value is 921−102=819 counts.

The supplier of the HVAC unit provided the 737 count value. This is the minimum number of counts of travel the mode door should exhibit. Also, the supplier recommended a 2 adjustment of this count value to compensate for a rubber gasket that contacts the door. Hence the final travel = 802 counts.

Since 819 counts is > 737, a valid feedback exists.

STATE 13A (MOVING THE BLEND DOOR FORWARD IN THE EXAMPLE)

CPU 29 makes the following RAM word and byte changes:
(1) Stores $01 in RAM word MTRCTRL to cause movement of the blend door in the forward direction.
(2) Stores a count of 48 in RAM byte MTRSTALL for establishing the time limit of travel for moving the blend door in the forward direction.
(3) Stores a 0 om RAM word IGNSUM to initialize the word.

STATE 13B (FOLLOWING THE BLEND DOOR STALL IN THE EXAMPLE)

CPU 29 makes the following RAM word and byte changes:
(1) RAM word CALTIMB now contains a value of 96. Note that (96 counts * 1/32 second=3 seconds). The 3 seconds represent the actual time of travel of the blend door in the forward direction.
(2) RAM word IGNSUM contains a value of 4800 representing the summation of ignition voltages during blend door movement.
(3) Computes the average ignition voltage count from the total count of 4800. Since 3 seconds represent the actual time of travel, then in $\frac{1}{8}$ second intervals, the 3 seconds=24 counts. Thus the average count for the blend door =4800 counts/24 counts=200 counts. CPU 29 stores the count of 200 in the BLNDIGN RAM byte.
(4) Restores the MTRSTALL byte to 0.

STATE 6 (WAITING FOR ANALOG INPUT TO SETTLE IN THE EXAMPLE)

CPU 29 makes the following RAM byte change:
(1) Stores $00 in RAM byte MTRCTRL in order to turn OFF all motors and wait for the analog feedback signals to settle.

STATE 10 (SAVING BLEND DOOR STOP 1 IN THE EXAMPLE)

CPU 29 makes the following RAM word change:
(1) Stores a count of 819 in RAM word STOPB1,
Then CPU 29 checks the analog feedback measurements of the Blend door to determine the presence of a valid feedback signal. This determination is based upon the amount of travel in A/D counts that occurred during calibration of the door motors. The following procedure is used to determine a valid feedback:
(a) Minimum allowable value for STOPB1- STOPB0= >522 counts; and
(b) Actual measured value is 819−204=615 counts.

The supplier of the doors provided the 522 count value. This is the minimum number of counts of travel the door should exhibit. Also, the supplier recommended a 2% adjustment of this count value to compensate for a rubber gasket that contacts the door. Hence the final travel = 602 counts.

Since 615 counts is > 522 counts, a valid feedback exists.

STATE 14A (DRIVING RECIRC DOOR FORWARD IN THE EXAMPLE)

CPU 29 makes the following RAM word and byte changes:
(1) Stores $02 in RAM byte MTRCTRL to cause the Recirc door to move forward.
(2) Stores a count of 48 in RAM byte MTRSTALL to establish a time limit for travel of the Recirc door in the forward direction.
(3) Stores a 0 in RAM word IGNSUM to initialize the word.

STATE 14B (LOOKING FOR A RECIRC DOOR STALL IN THE

CPU 29 makes the following RAM word and byte changes:
(1) RAM word CALTIMR now contains a value of 64. Note that (64 counts * 1/32 second=2 seconds). The 2 seconds represent the actual time of travel of the blend door in the forward direction.
(2) RAM word IGNSUM contains a value of 3200 representing the summation of ignition voltages during Recirc door movement.
(3) Computes the average ignition voltage count from the total count of 3200. Since 2 seconds represent the actual time of travel, then in $\frac{1}{8}$ second intervals, the 2 seconds=16 counts. Thus the average count for the blend door=3200 counts/16 counts =200 counts.
(4) Restores 0 in the RAM byte MTRSTALL.

STATE 7 (WAITING FOR ANALOG INPUT TO SETTLE IN THE EXAMPLE)

CPU 29 makes the following RAM word change:
(1) Store $00 in RAM word MTRCTRL in order to turn OFF all motors.

STATE 15 (THE END OF CALIBRATION IN THE EXAMPLE) A REVIEW OF THE EXAMPLE

States 1–3 move all three doors to starting positions. State 4 allows the mode door motor feedback signal to settle. State 8 saves the external ADC feedback value for the mode door. State 12A establishes a motor stall time limit; drives the mode door from the starting position to a stall condition at the other stop. After the stall, in state 12B, CPU 29 obtains the external ADC feedback value at the other stop; has saved the actual time of travel; has summed the ignition voltage values from the internal ADC every $\frac{1}{8}$ second and then determines the average count of the ignition voltage for the mode door at the stall; then sets the MTRSTALL byte to 0. State 5, CPU 29 waits for the mode door feedback to settle. Then in state 9, CPU 29 reads the external ADC feedback value; also stores the starting position feedback value for the blend door; then determines if a valid feedback exists.

States 13A–10 accomplishes the same type information for the blend door as was obtained in states 8–9 for the mode door.

States 14A–7, CPU 29 determines the time of travel of the Recirc door from the starting position to the stall condition and the average ignition voltage accumulated during travel.

CPU 29 reads the vendor supplied count values from locations of EEPROM 35 of MCU 28, supplies the time limits placed in the MTRSTALL BYTE in RAM from ROM 33 locations; determines the calibration travel time by incrementing RAM words and determines the IGNSUM values by summing the changes measured in the IGNSUM RAM word. Although not shown, output means may be provided for displaying or recording the results of calibrating the motor systems.

The present invention is to be limited only in accordance with the scope of the appended claims. Although the present invention has been described with reference to a preferred embodiment, numerous modifications and rearrangements can be made, and still come within the scope of the invention.

We claim:

1. A firmware/hardware motor calibration system for measuring motor load conditions of electric motors and time of movement between physical stops of mechanical structures coupled to output shafts of the electric motors, the system being used to calibrate electric motors arranged to operate as hybrid closed loop and open loop motor control systems, the closed loop motor control systems employing motors with potentiometers which provide analog signal representations of changes in position of the motor shafts, the motor shafts in both the open and closed loop systems being connected to linkage for moving attached structures over arcuate paths between at least two physical stop positions, the system comprising:

(A) an input power device having terminals for receiving electric power from a designated source and generating therefrom regulated and raw power used by components in the system, the input device including an On and OFF switch for applying or removing electric power from the system when desired;

(B) motor drivers having a first set of input terminals for receiving the regulated and raw powers and a second set of input terminals for receiving logical control signals and providing therefrom at output terminals voltage control signals for bi-directional control of movement of the motor shafts in the closed and open loop systems in response to the logical control signals;

(C) an external analog-to-digital converter (ADC) having input terminals coupled to potentiometers of the closed loop motors which provide analog signal representations of changes in position of the motor shafts and producing therefrom at output terminals digital signal equivalents of the analog signal representations;

(D) a microcontroller having:

(1) a timer system which provides a reference clock signal and operates in conjunction with RAM based counters to provide therefrom at a first output terminal a first clock signal apportioned to the chosen frequency of the reference clock signal and at a second output terminal a second clock signal of another chosen frequency apportioned to the first clock signal;

(2) door motor control firmware containing instructions used by a CPU of the microcontroller for generating the digital signals used to form the logical control signals sent to the second set of terminals of the motor drivers, the CPU requesting instructions from the door motor control firmware at a rate dictated by the first clock signals;

(3) programmable input/output circuits containing (a) programmable output registers for receiving at input terminals the digital signals from the CPU and producing therefrom at output terminals the logical control signals sent to the second set of terminals of the motor drivers, (b) a serial peripheral interface which receives variable digital signals from the external ADC and producing therefrom digital data used by the CPU to establish ends of travel of the structures attached to the motor shafts, and a determination of whether the external ADC values are valid and (c) an internal ADC for receiving variations of the raw power from the input power device while a motor shaft rotates and then providing equivalent digital values used by the CPU to derive the average system voltage relative to the motor; and (4) door motor calibration firmware containing instructions used by the CPU for: (a) receiving the variable digital data from the external ADC and then determining if the external ADC values are valid; (b) receiving variable digital data from the internal ADC and computing and storing therefrom the average system voltage of the motor (c) requesting the execution of instructions from the door motor control firmware for turning ON a motor and obtaining the time of door movement from a starting position to a stall condition and for turning OFF a motor to allow for settlement of the motor feedback for closed loop motors, the CPU requesting instructions from the door motor calibration firmware at a rate dictated by the second clock signal.

2. Apparatus in accordance with claim 1 wherein the door calibration firmware contains instructions arranged to form a state machine wherein the CPU is instructed to perform tasks sequentially from one state to the next, wherein the states include: initially waiting before proceeding for the raw voltage to stabilize; driving all motors to a starting position; allowing the feedback voltages from the potentiometers of the motors of the closed loop systems to stabilize; saving the stabilized feedback voltage values; independently driving each motor to a normal stall position; allowing any feedback voltage to stabilize before determining if a feedback voltage value is valid, calculating time of travel to the stalled condition, and determining the average system voltage relative to the motor being moved to the stall condition.

3. Apparatus in accordance with claim 2 wherein time of travel and the voltage level values are obtained for the open loop motors.

4. Apparatus in accordance with claim 1 wherein the first clock signal is four times the rate of the second clock signal.

5. Apparatus in claim 1 wherein the actual time of movement, the valid feedback values and the average ignition voltage values of the motors of the closed loop system and the actual time of movement and the average voltage values for the open loop motors are saved for comparison and calculation purposes in future use of the hybrid control system.

6. Apparatus of claim 1 wherein time limits are provided for detecting abnormal stall conditions of both the open and closed loop motors, wherein exceeding the provided time limit provides an indication of the presence of an electrically unattached motor, defective motor or attached defective mechanical structure.

7. A method of measuring motor voltage consumption conditions of electric motors and time of travel of movement between physical stops of mechanical structures coupled to the shafts of the electric motors, the system being used to calibrate the electric motors arranged to operate as hybrid closed loop and open loop motor control systems, the closed loop systems employing motors with potentiometers which provide analog signal representations of changes in position of the motor shafts, the motor shafts in both the open and closed loop system being connected to linkages for moving attached structures over arcuate paths between at least two physical stop positions, the method comprising the steps of:

(a) providing an external analog-to-digital converter (ADC) connected to the potentiometers of the closed loop motors for converting potentiometer voltage values to shaft position data;

(b) providing a first and a second clock signal, the first clock signal being of a rate four times faster than the second clock signal;

(c) driving the open and closed loop motors to starting positions to begin the measuring process;

(d) allowing potentiometer feedback voltages of the closed loop motor to stabilize after reaching the starting positions;

(e) driving each closed loop motor separately to a normal stall location;

(f) measuring the time of travel between the starting position and the stall condition position;

(g) accumulating voltage amplitude changes of the raw voltage supplied to the motor being moved;

(h) after allowing the voltage of the potentiometer to stabilize, computing the potentiometer voltage at the stall condition position;

(i) comparing the difference between the potentiometer voltage value at the starting position to the potentiometer voltage value at the stall condition position with a predetermined value to determine the validity of the potentiometer voltage value;

(j) computing the time of travel and the average system voltage relative to the motor in the open loop motor control system; and then (k) saving the derived average voltages, time of movement and the valid potentiometer voltage values for future use.

8. The method of claim 6 wherein time limits are provided for determining abnormal stall conditions if the actual time of movement of the motor shafts exceed the provided time limit.

* * * * *